United States Patent [19]
Sanjoh et al.

[11] Patent Number: 5,535,304
[45] Date of Patent: Jul. 9, 1996

[54] INFERENCE SYSTEM HAVING A FRAME STRUCTURE AND METHOD OF STORING INFORMATION THEREIN

[75] Inventors: Minako Sanjoh, Yokohama; Shoichi Kojima, Fujisawa; Naomichi Sueda, Isehara, all of Japan

[73] Assignee: Kabushiki Kaisha Toshiba, Kawasaki, Japan

[21] Appl. No.: 222,342

[22] Filed: Apr. 4, 1994

Related U.S. Application Data

[63] Continuation of Ser. No. 962,009, Oct. 15, 1992, abandoned, which is a continuation of Ser. No. 616,259, Nov. 20, 1990, abandoned.

[30] Foreign Application Priority Data

Nov. 22, 1989 [JP] Japan .................................. 1-305022

[51] Int. Cl.⁶ .............................. G06F 17/00; G06F 15/18
[52] U.S. Cl. ................... 395/62; 395/10; 395/60; 395/65
[58] Field of Search .................... 395/62, 76, 906, 395/65, 75, 51, 900; 364/513, 200, 900, 133

[56] References Cited

U.S. PATENT DOCUMENTS

| | | |
|---|---|---|
| 4,675,829 | 7/1984 | Clemenson . |
| 4,803,641 | 2/1989 | Hardy et al. ............................. 395/76 |
| 4,803,642 | 2/1989 | Muranaga ............................. 364/513 |
| 4,853,873 | 8/1989 | Tsuji et al. ............................. 364/513 |
| 4,868,733 | 9/1989 | Fujisawa et al. ...................... 364/513 |
| 4,935,876 | 6/1990 | Hanatsuka ............................. 364/513 |
| 4,959,799 | 9/1990 | Yoshiura et al. ...................... 364/513 |
| 4,964,063 | 10/1990 | Esch ....................................... 364/513 |
| 4,964,064 | 10/1990 | Tsutsumitake et al. ............... 395/62 |
| 4,967,371 | 10/1990 | Muranaga et al. ..................... 395/62 |
| 4,972,328 | 11/1990 | Wu et al. ............................... 364/513 |
| 4,982,340 | 1/1991 | Oyanagi et al. ....................... 364/133 |
| 5,018,075 | 3/1991 | Ryan et al. ............................ 364/513 |
| 5,119,318 | 6/1992 | Paradies et al. ...................... 395/61 |
| 5,179,632 | 1/1993 | Mofui et al. .......................... 395/64 |
| 5,224,204 | 6/1993 | Tsuruta et al. ........................ 395/925 |
| 5,230,061 | 7/1993 | Welch .................................... 395/51 |
| 5,295,230 | 3/1994 | Kung ...................................... 395/75 |
| 5,359,701 | 10/1994 | Fukui et al. ........................... 395/62 |

OTHER PUBLICATIONS

"Embedding Learning in General Frame–Based Architecture" Toshiicazu Tanaka and Tom M. Mitchell, IEEE 1989.
"AI in Computer Vision", John Cuadrado and Clara Cuadrado, Jan. 1986, Byte.
"Frames in CLOS", Jim Veitch, AI Expert, Jun. 1991.
"An Expert System for a Portfolio Management using both Frames and Production Rules", Chan et al, 8th Inter. Workshop Expert Systems and their Applications, May 30, 1988 to Jun. 3, 1988.
Williams et al, "Knowledge based support systems for uncertain complex tasks"; Intelligent Systems Engineering, vol: 1, Iss: 2, pp. 87–101, Winter 1992.

*Primary Examiner*—David K. Moore
*Assistant Examiner*—Tariq Rafiq Hafiz
*Attorney, Agent, or Firm*—Banner & Allegretti, Ltd.

[57] ABSTRACT

In an inference system, an inference mode and a knowledge editing mode can conduct inference with an inherent effect by using knowledge represented by frames in a hierarchical structure, the frames having a relationship of a parent frame being higher in the hierarchical structure than a child frame thereof. Such an inference system includes a mode determining section for selecting the knowledge editing mode or the inference mode, a storage area for storing only information intrinsic to a frame in the hierarchical structure into the frame when the knowledge editing mode is selected by the mode determining section, and a storage area for storing into the frame both information intrinsic to the frame and information inherited by the frame from frames higher in the hierarchical structure than the frame when the inference mode is selected by the mode determining section.

4 Claims, 4 Drawing Sheets

INFERENCE SYSTEM HAVING A FRAME STRUCTURE AND METHOD OF STORING INFORMATION THEREIN

This application is a continuation of application Ser. No. 07/962,009, filed Oct. 15, 1992, which is a continuation of Ser. No. 07/616,259, filed Nov. 20, 1990, both now abandoned.

BACKGROUND OF THE INVENTION

1. Field of the Invention

The present invention relates to an inference system having a frame structure and storing method of inheritance information therein.

2. Description of the Related Art

Generally, a dynamic knowledge such as data in an inference system is represented in a hierarchical frame structure with an inherent effect. In such a hierarchical frame structure with inherent effect, information which is stored in a parent frame is inherited from the parent frame by a child frame. When information which is stored in the parent frame is updated, the information inherited from the parent frame by the child frame is also updated. However, the information inherited by the child frame cannot be updated by the child frame.

FIG. 8 is a schematic describing such a hierarchical frame structure with inherent effect.

In the figure, reference numeral 11 is a parent frame; reference numeral 12 is a child frame of the parent frame 11; and reference numeral 13 is a child frame of the child frame 12. The parent frame 11 has information a intrinsic thereto. The child frame 12 has information b intrinsic thereto along with the information a inherited from the parent frame 11. Although the child frame 13 has information a and b inherited from the child frame 12, it does not have intrinsic information. In other words, since the parent frame 11 has the intrinsic information a, the information a is inherited by the child frame 12. In addition, since the child frame 12 has both the intrinsic information b and the information a which is inherited from the parent frame 11, the information a and b are inherited by the child frame 13. When the information b of the child frame 12 is updated to information c, the child frame 12 has the information a and c. Thus, the information a and c are inherited by the child frame 13. In other words, when the information which is stored in the child frame 12 is updated, the information which is stored in the child frame 13 is also updated. However, the information a which is stored in the child frame 12 cannot be updated to information d because the information a is information which is inherited from the parent frame 11. In this case, an update operation from the information a to the information d should be conducted in the parent frame 11. In other words, when the information a is updated to the information d in the parent frame 11, the information d is inherited by the child frame 12. In this case, the child frame 12 has the information d and b. On the other hand, the child frame 13 has the information d and b.

There are two methods for storing inheritance information in such an inference system with knowledge in frame structure. In one method, both information which is intrinsic to a frame and information which is inherited by the frame are stored therein (see FIG. 9 (a)). In the other method, only information which is intrinsic to a frame is stored therein (see FIG. 9 (b)).

In the method shown in FIG. 9 (a), when information which is stored in a frame is updated, information to be inherited by the frame cannot be updated. In the following, the case where information which is intrinsic to a frame is updated will be described. When information Which is intrinsic to a frame is updated, if the frame has child frames, the information to be inherited by the child frames is updated hierarchically frame by frame. For example, when the information a stored in the parent frame 11 is updated to the information d, the information which is stored in the child frame 12 becomes d and b and the information which is stored in the child frame 13 also becomes d and b. In such a method, when information which is stored in a frame is referenced, the following operation takes place. In the case where information which is intrinsic to a frame is referenced, when the frame is accessed, the information a which is intrinsic to the frame can be referenced. For example, as shown in FIG. 9 (a), when the parent frame 11 is accessed, the information a which is intrinsic to the frame can be referenced. On the other hand, in the case where information to be inherited by a frame, when the frame is accessed, the information to be inherited by the frame is referenced. For example, in FIG. 9 (a), when the child frame 13 is accessed, the information a and b which have been inherited by the frame can be referenced.

In the method shown in FIG. 9 (b), when information which is stored in a frame is updated, only the information which is intrinsic to the frame is updated. Since information to be inherited by a child frame has not been stored therein, it is not necessary to access the child frame. Moreover, in such a method, when information which is stored in a frame is referenced, the following operation takes place. In the case where information which is intrinsic to a frame is referenced, when the frame is accessed, information which is intrinsic to the frame can be referenced. For example, in the case as shown in FIG. 9 (b), when the parent frame 11 is accessed, the information a which is intrinsic to the frame can be referenced. On the other hand, when information to be inherited by a frame is referenced, an ancestry with intrinsic information which is inherited by the frame is searched and thereby the information is referenced. For example, in the case as shown in FIG. 9 (b) where the information which is stored in the child frame 13 is referenced, since the child frame 13 does not have information which is intrinsic thereto and does not store information to be inherited thereby, the intrinsic information b stored in the child frame 12 and the intrinsic information a stored in the parent frame 11 are hierarchically searched and referenced.

As was described above, information stored in the aforementioned inference system is updated and referenced in different manners depending on the storing methods.

On the other hand, knowledge in the inference system is handled in different manners depending on whether it is inferred or not. The state when inference system inferred is named inference state, while the state where knowledge is not inferred is named out-of-inference state or knowledge editing mode. In other words, in the out-of-inference state, the user of the system mostly edits the knowledge. In other words, the knowledge is mostly updated. On the other hand, in the inference state, since the edited knowledge is used, it is mostly referenced.

Then, for the cases where information stored in a frame is updated and referenced, the storing method of knowledge shown in FIG. 9 (a) and that shown in FIG. 9 (b) will be compared in the following.

First, in the case where information stored in a frame, these methods are compared.

In the storing method shown in FIG. 9 (a), information to be inherited by a descendant frame (which is a frame a plurality of generations down from another frame) is updated through the generations. On the other hand, in the storing method as shown in FIG. 9 (b), only information stored in a frame as intrinsic information is updated. In other words, in the case where information stored in a frame is updated in the storing method shown in FIG. 9 (a), when the frame has child frames, information which is intrinsic thereto should be also updated. Thus, the efficiency of that method is worse than that shown in FIG. 9 (b). In particular, in the out-of-inference state, it is mostly updated. Thus, the storing method shown in FIG. 9 (a) has a problem.

Then, the case where information stored in a frame is referenced will be described.

In the storing method of knowledge shown in FIG. 9 (a), even if information to be referenced is information to be inherited and is intrinsic to the frame, the frame is accessed. On the other hand, in the storing method of knowledge shown in FIG. 9 (b), when all information of a frame is intrinsic thereto, it is possible to access only the frame. However, if the information includes information to be inherited, it is necessary to reference the information hierarchically through the ancestry frames. In other words, in the case where information stored in a frame is referenced, when the frame has information being inherited, the storing method shown in FIG. 9 (b) is worse than that shown in FIG. 9 (a). In particular, in the inference state, since knowledge is mostly referenced, it is said that the storing method shown in FIG. 9 (b) has a problem.

SUMMARY OF THE INVENTION

As was described above, there are two storing methods for inheritance information in inference systems with knowledge in frame structure, namely, one method for storing information which is intrinsic to a frame and information to be inherited and the other method for storing only information which is intrinsic to a frame. However, in the former method, in the out-of-inference state, the efficiency is bad. In the latter method, conversely, in the inference state, the efficiency is bad.

Therefore, an object of the present invention is to solve such problems and to provide an inference system in frame structure with high process efficiency regardless of the out-of-inference state or inference state and a storing method of inheritance information in the system.

In other words, according to the present invention, in the out-of-inference state, only information which is intrinsic to a frame is stored therein. On the other hand, in the inference state, both information which is intrinsic to a frame and information to be inherited thereto are stored. Thus, a high process efficiency is obtained regardless of the out-of-inference state or inference state.

DESCRIPTION OF PREFERRED EMBODIMENT

Now, by referring to the accompanying drawings, an embodiment of the present invention will be described.

Figure 1:
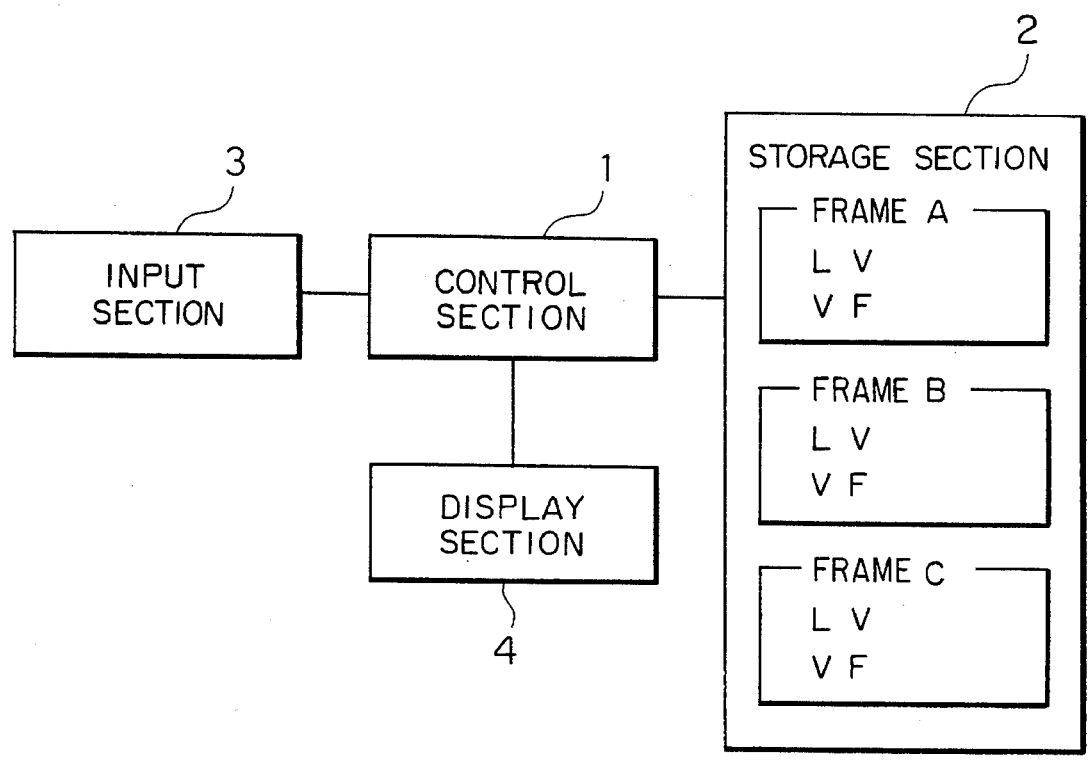
FIG. 1 is a schematic showing the structure of an inference system according to an embodiment of the present invention.

FIG. 1 is a schematic showing the structure of an inference system according to an embodiment of the present invention. In the figure, reference numeral 1 is a control section for generally controlling the system; reference numeral 2 is a storage section for storing the content of a frame and so forth; reference numeral 3 is an input section for determining the inference state or out-of-inference state and for inputting information and a command; and reference numeral 4 is a display section.

In the storing section 2, frame A is a parent frame; frame B is a child frame thereof; and frame C is a child frame thereof. Each frame has areas for local value (LV) (an intrinsic value of the slot) and value facet (VF) (an inherited value and an intrinsic value of the slot).

Figure 2:
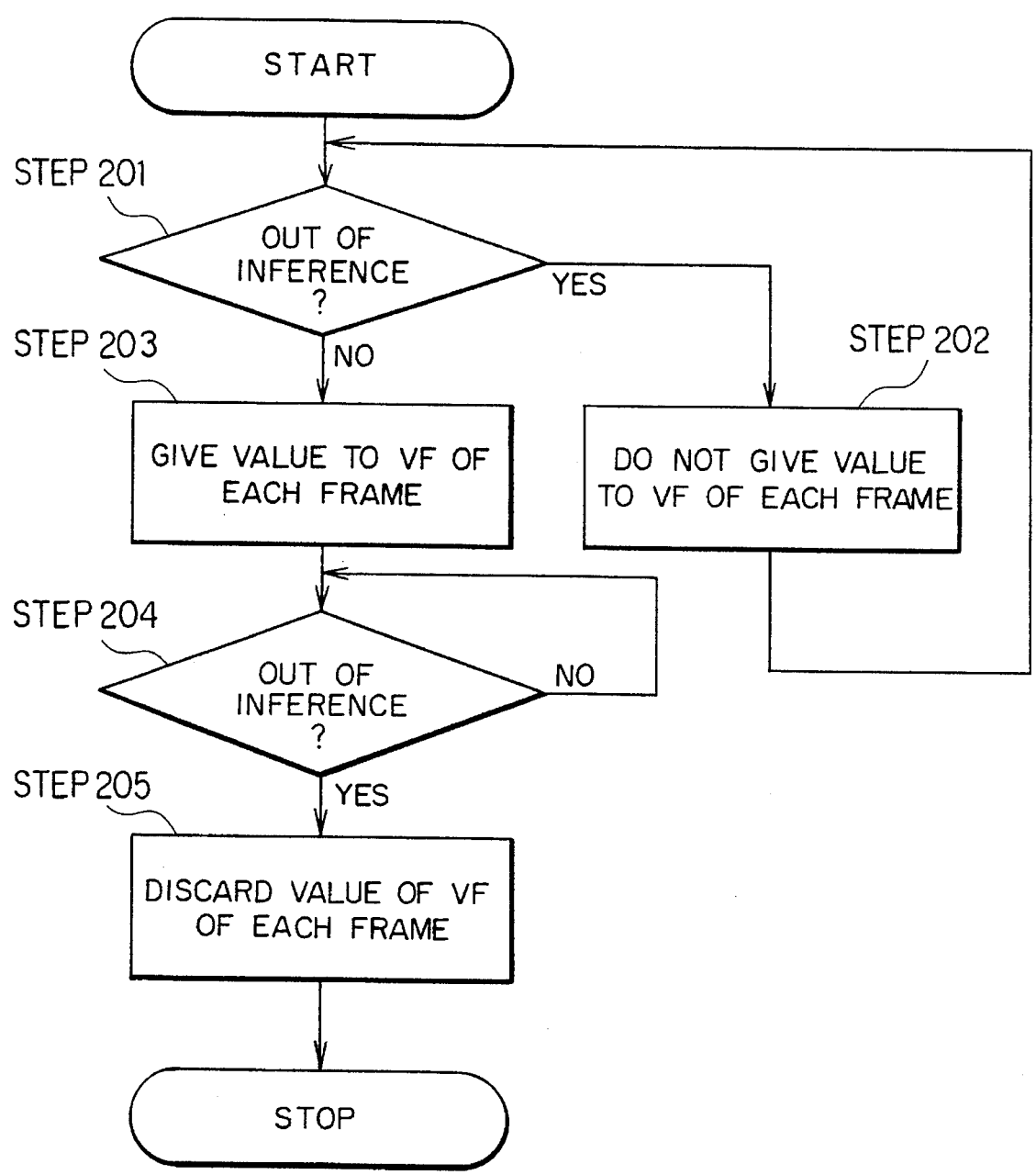
FIG. 2 is a flow chart showing the operation of the inference system according to the embodiment.

Then, by referring to the flow chart shown in FIG. 2, the operation of the inference system of the embodiment will be described in the following.

However, it is assumed that each frame has intrinsic values a, b, and c.

The control section 1 determines whether the mode is currently in the out-of-inference state or in the inference state according to the input information from the input section 3 (in step S201).

Figure 3:
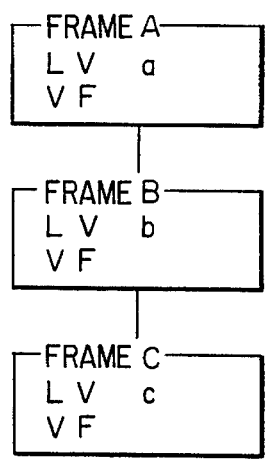
FIG. 3 is a schematic showing the content of a frame in out-of-inference state according to the embodiment.

As shown in FIG. 3, in the out-of-inference state, each frame does not have a value with respect to VF (in step 202).

Then, the operation for referencing information in the out-of-inference state will be described in the following.

When a frame has information to be inherited, it is referenced hierarchically from the parent frame to the highest ancestor frame. For example, when information supplied to frame C is referenced, first, frame C is accessed and information C in LV is referenced. Thereafter, the parent frame of frame C is accessed. Since the parent frame of frame C is frame B, information b in LV of frame B is referenced. In addition, since the parent frame of frame B is frame A, information a in LV of frame A is referenced. On the other hand, since frame A does not have the parent frame, other reference operation is stopped. Thus, information a, b, c supplied to frame C are referenced.

Then, the operation of updating inheritance information in the out-of-inference state will be described in the following.

Since the frames do not have information to be inherited, only information which is intrinsic to the frames is changed.

Figure 4:
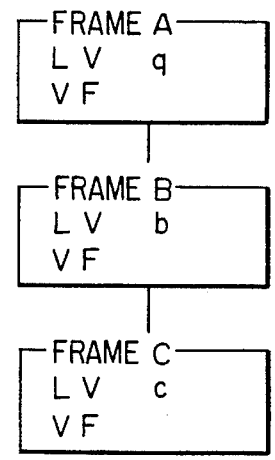
FIG. 4 is a schematic showing the content of a frame in updating inheritance information in the out-of-inference state according to the embodiment.

For example, When an intrinsic value of frame A, which is the highest frame, is changed from a to q, each frame has information as shown in FIG. 4.

Figure 5:
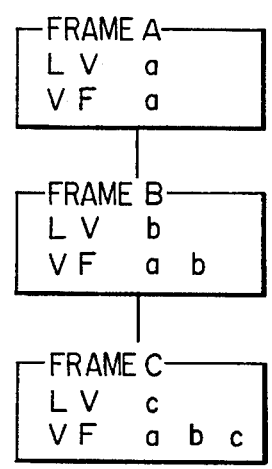
FIG. 5 is a schematic showing the content of a frame in inference state according to the embodiment.

On the other hand, in the inference state, each frame has a value with respect to VF as shown in FIG. 5 (in step S203). In other words, when the mode is changed to the inference state, for the frames which have the relationship of parent and child, a value is input to VF in the descending order. The value with respect to VF of each frame in the aforementioned structure is obtained as follows. First, since frame A is the highest frame, the value of LV thereof is input to VF. Then, the value of VF of frame A and the value of LV of frame B are input to VF of frame B. The value of VF of frame B and the value of LV of frame C are input to VF of frame C.

In the case where information is referenced in the inference state, for information to be inherited by a frame, the value of VF of the frame is referenced. For example, when information stored in frame C, which is the lowest frame, is referenced, VF of frame C is referenced. Thus, values a, b, and c are obtained.

Then, the operation for updating inheritance information in the inference state will be described in the following.

Since the frames have information to be inherited, information is updated hierarchically from the frame which has information being updated to the lowest frame in the descending order.

Figure 6:
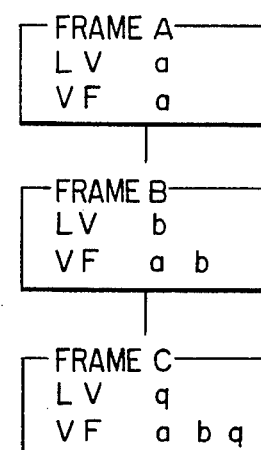
FIG. 6 is a schematic showing a first example of the content of a frame in updating inheritance information in the inference state according to the embodiment.

In the inference state, information of lower frames is mostly updated. As an example, the case where an intrinsic value of frame C, which is the lowest frame, is changed from c to q will be described in the following. First, the value c of LV of frame C is changed to q. Thus, each frame has information as shown in FIG. 6.

Figure 7:
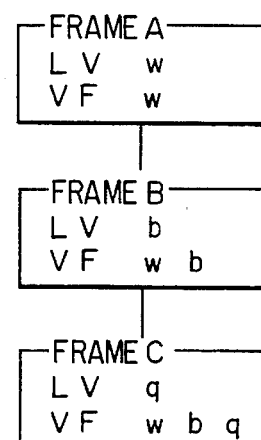
FIG. 7 is a schematic showing a second example of the content of a frame in updating inheritance information in the inference state according to the embodiment.
Figure 8:
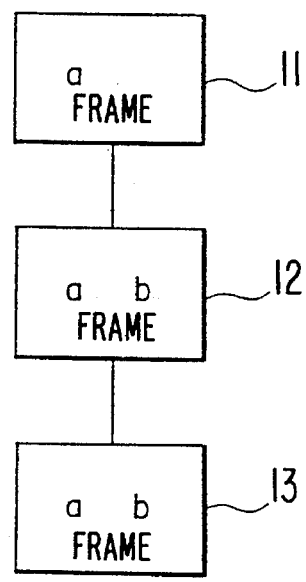
FIG. 8 is a schematic describing a hierarchical frame structure with inherent effect of a related art.
Figure 9A:
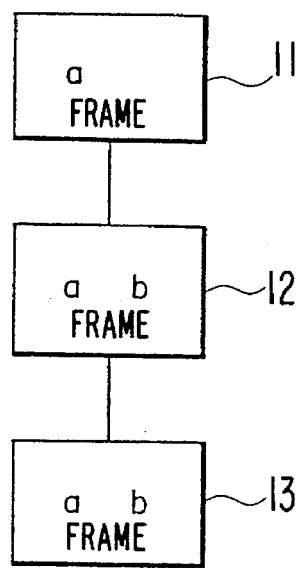
FIG. 9 (a) and (b) are schematics describing storing methods of inheritance information in an inference system with knowledge in frame structure of the related art.
Figure 9B:
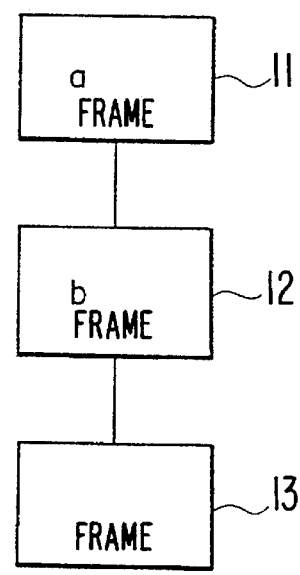

However, when information stored in a higher frame is updated, in such a storing method, information stored in the lower frames should be accordingly changed. For example, the case where information a which is intrinsic to frame A is updated to w will be described in the following. First, the value a of LV of frame A is updated to W. Thereafter, the value a of VF of frame A is updated to w. Then, the value b of LV of frame B and the value w of VF of frame A are treated as the value of VF of frame B. Thus, the value of VF of frame B becomes w and b. In addition, for frame C, which is a child frame of frame B, the same operation is conducted. Thus, the value of VF of frame C becomes w, b, and q. On the other hand, since frame C does not have a child frame, the operation is completed. Thus, each frame has information as shown in FIG. 7.

Thereafter, when an input for switching the mode from the inference state to out-of-inference state is conducted (in step S204), the value of VF of each frame is discarded (in step S205). Thus, for example, in the inference state, since each frame as shown in FIG. 5 becomes the inference state, the state shown in FIG. 3 takes place.

As was described above, according to the present invention, in the inference state where information is mostly updated, only information which is intrinsic to a frame is stored. On the other hand, in the out-of-inference state where information is mostly referenced, information which is intrinsic to a frame and information by be inherited thereby is stored therein. Thus, in both of the inference state and the out-of-inference state, high process efficiency is obtained.

What is claimed is

1. An inference system having an inference mode and a knowledge editing mode for conducting inference with an inherent effect by using a knowledge represented by a plurality of frames in a hierarchical structure which have a relationship of a parent frame being higher in the hierarchical structure than a child frame thereof, said inference system comprising:

mode selecting means for selecting one of said knowledge editing mode and said inference mode;

first storing means for storing only information intrinsic to a first memory area of one of said frames into said one of said frames when said knowledge editing mode is selected by said mode selecting means;

second storing means for storing into a second memory area of said one of said frames both information intrinsic to said one of said frames, and information inherited by at least said one of said frames from frames higher in the hierarchical structure than said one of said frames when said inference mode is selected by said mode selecting means; and memory clearing means for clearing information stored in said second memory area when a mode of the inference system changes from the inference mode to the knowledge editing mode.

2. A knowledge storing method for use in an inference system using a plurality of frames in a hierarchical structure which have a relationship of a parent frame being higher in the hierarchical structure than a child frame thereof, said knowledge storing method comprising the steps of:

storing only information intrinsic to a frame in the hierarchical structure into a first memory area of one of said frames when the inference system is in a knowledge editing mode;

storing into said one of said frames both information intrinsic to a second memory area of said one of said frames, and information inherited by at least said one of said frames from frames higher in the hierarchical structure than said one of said frames when the inference system is in an inference mode; and clearing information stored in said second memory area when a mode of the inference system changes from the inference mode to the knowledge editing mode.

3. An inference system having an inference mode and a knowledge editing mode for conducting inference with an inherent effect by using a knowledge represented by a plurality of frames in a hierarchical structure which have a relationship of a parent frame being higher in the hierarchical structure than a child frame thereof, said inference system comprising:

mode selecting means for selecting one of said knowledge editing mode and said inference mode;

first storing means for storing only information intrinsic to a first memory area of one of said frames into said one of said frames when said knowledge editing mode is selected by said mode selecting means;

second storing means for storing into a second memory area of said one of said frames both information intrinsic to said one of said frames, and information inherited by at least said one of said frames from frames higher in the hierarchical structure than said one of said frames when said inference mode is selected by said mode selecting means;

first referencing means for referencing only said first memory area of said one of said frames when said knowledge editing mode is selected by said mode selecting means; and second referencing means for referencing only said second memory area of said one of said frames when said inference mode is selected by said mode selecting means.

4. A knowledge storing method for use in an inference system using a plurality of frames in a hierarchical structure which have a relationship of a parent frame being higher in the hierarchical structure than a child frame thereof, said knowledge storing method comprising the steps of:

storing only information intrinsic to a frame in the hierarchical structure into a first memory area of one of said frames when the inference system is in a knowledge editing mode;

storing into said one of said frames both information intrinsic to a second memory area of said one of said frames, and information inherited by at least said one of said frames from frames higher in the hierarchical structure than said one of said frames when the inference system is in an inference mode;

referencing only said first memory area of said one of said frames when said knowledge editing mode is selected by said mode selecting means; and referencing only said second memory area of said one of said frames when said inference mode is selected by said mode selecting means.

* * * * *